(12) United States Patent
Lolato

(10) Patent No.: US 7,049,554 B2
(45) Date of Patent: May 23, 2006

(54) ADJUSTABLE HEATER FOR AQUARIA

(75) Inventor: Samuele Lolato, Pove del Grappa (IT)

(73) Assignee: Eden SRL, Cartigliano (IT)

( * ) Notice: Subject to any disclaimer, the term of this patent is extended or adjusted under 35 U.S.C. 154(b) by 28 days.

(21) Appl. No.: 10/510,496

(22) PCT Filed: May 7, 2003

(86) PCT No.: PCT/IB03/01788

§ 371 (c)(1),
(2), (4) Date: Oct. 7, 2004

(87) PCT Pub. No.: WO03/094609

PCT Pub. Date: Nov. 20, 2003

(65) Prior Publication Data

US 2005/0173409 A1  Aug. 11, 2005

(30) Foreign Application Priority Data

May 7, 2002 (IT) .......................... VI2002A0086

(51) Int. Cl.
*H05B 3/06* (2006.01)
(52) U.S. Cl. .................. 219/523; 219/489; 392/498
(58) Field of Classification Search ................ 219/523, 219/510, 512, 448.16, 448.18; 392/498; 337/36

See application file for complete search history.

(56) References Cited

U.S. PATENT DOCUMENTS

| | | | | |
|---|---|---|---|---|
| 2,839,660 A | * | 6/1958 | Davies | .................. 219/534 |
| 3,107,289 A | | 10/1963 | Willinger | |
| 3,746,836 A | * | 7/1973 | Summerfield et al. | ...... 392/498 |
| 3,890,486 A | | 6/1975 | Fitzgerald | |
| 4,124,793 A | * | 11/1978 | Colman | ...................... 219/523 |
| 4,276,466 A | * | 6/1981 | Middleman et al. | ........ 219/523 |
| 4,315,143 A | | 2/1982 | Willinger et al. | |
| 4,812,626 A | * | 3/1989 | Strada | .......................... 219/523 |
| 4,876,527 A | * | 10/1989 | Oka et al. | ................... 340/441 |
| 4,975,562 A | | 12/1990 | Friedman | |
| 5,184,269 A | * | 2/1993 | Shimada et al. | ............... 361/24 |
| 5,392,380 A | * | 2/1995 | Tsai | ........................... 392/498 |
| 5,408,579 A | * | 4/1995 | Hunt | .......................... 392/498 |
| 6,584,280 B1 | * | 6/2003 | Wang | ......................... 392/498 |

\* cited by examiner

*Primary Examiner*—Robin O. Evans
*Assistant Examiner*—Vinod Patel
(74) *Attorney, Agent, or Firm*—Dykema Gossett PLLC

(57) ABSTRACT

An adjustable heater for aquaria, comprising a substantially tubular container (2) within which are housed an electrical heating element (3), a switch (6) comprising s fixed contacts (7, 8) and moving contacts (9, 10) and capable of electrically connecting the heating element (3) with an external source (R) of electrical power, a temperature sensor (12) with a bi-metal strip (13) capable of detecting the temperature of the liquid and interacting with the switch (6) to move it from a closed position to an open position when a predetermined temperature (T) is to reached. The moving contacts (9, 10) of the switch (6) are secured to a free end (13") of the bi-metal strip (13) while the other end (13") of the bi-metal strip (13) is electrically insulated. This yields the advantage that electrical current does not pass through the bi-metal strip (13) and therefore does not create a Joule effect within it which affects the sensitivity and proper behavior of the temperature Is sensor (12).

14 Claims, 4 Drawing Sheets

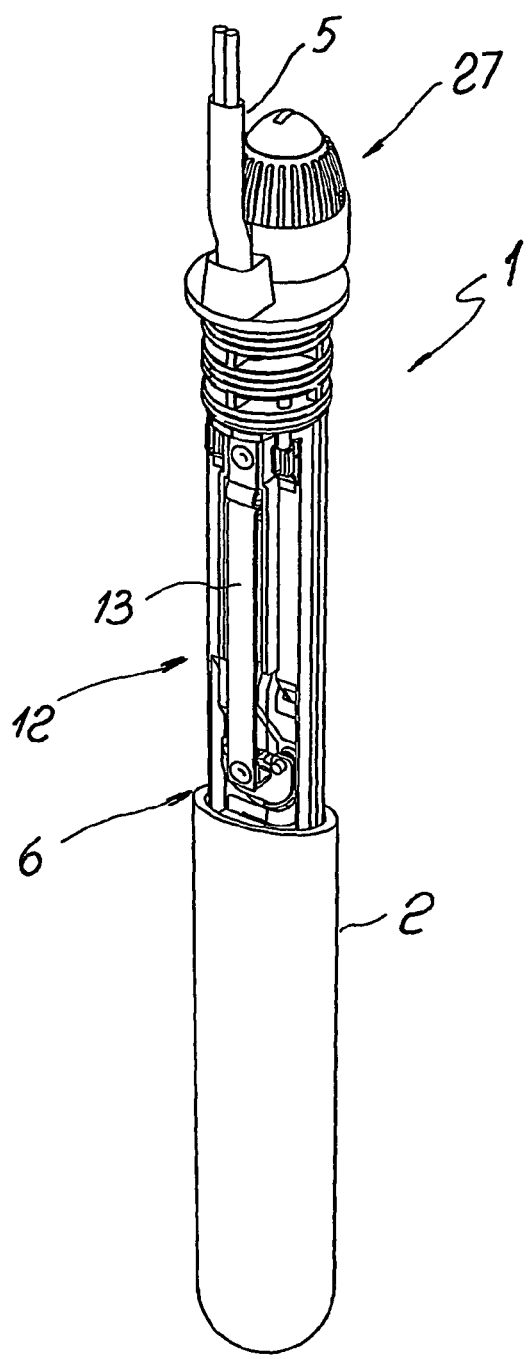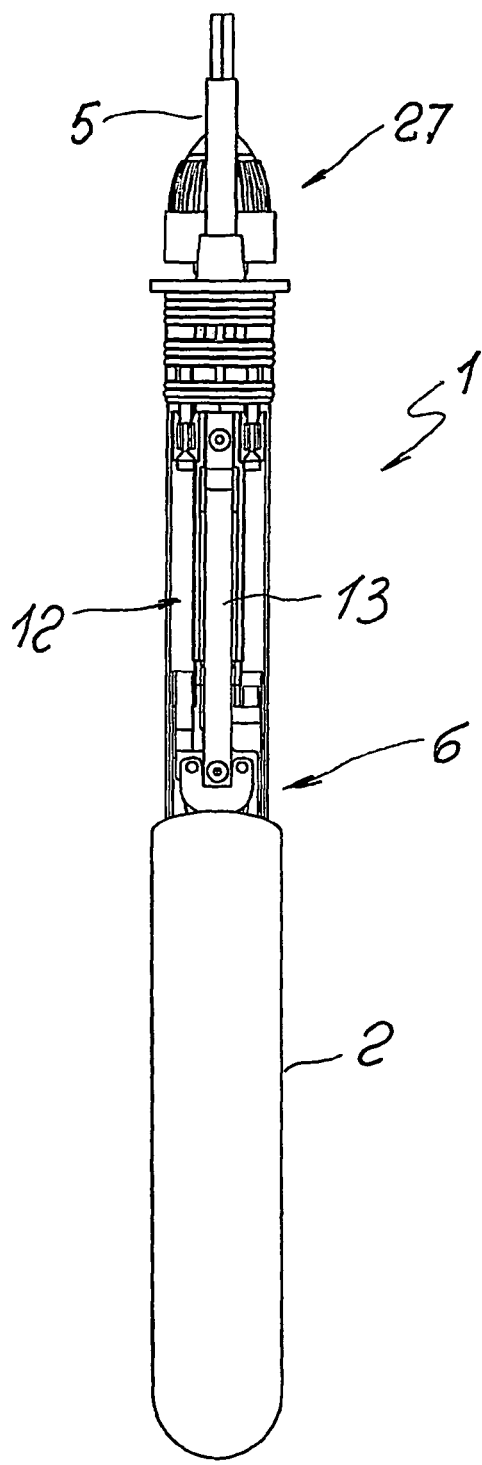
FIG. 1　　　　FIG. 2

ADJUSTABLE HEATER FOR AQUARIA

TECHNICAL FIELD

This invention relates to an adjustable heater for aquaria having all the features included in the preamble of claim 1.

BACKGROUND ART

It is known that most fish kept in aquaria are of tropical origin. The living conditions for such animal species are marked by temperatures which on average lie between 22 and 26° C.

Temperatures above or below the abovementioned range may be fatal to fish living in aquaria.

Electric heaters or temperature regulators are generally used to maintain this temperature range, and these essentially comprise a glass bulb in which an electrical resistance and a thermostat, that is a component which detects the temperature of the water and compares it with the reference value to open and close the electricity supply circuit to the resistance, are hermetically housed.

Thermostats of the electronic type which have a good quality sensor but an excessive cost, which greatly limits their application, are known.

Another known type of thermostat is that of the bi-metal strip in which the switch which brings about opening and closing of the supply circuit comprises a pair of metal strips having different thermal expansion coefficients adjacent and joined together in such a way as to form a single unit.

This type of switch has one end attached to one of the terminals of the electricity supply line, and the other end is provided with a moving contact which selectively joins together with a fixed contact attached to the other terminal of the same line.

As the temperature changes the differential expansion of the two strips causes a change in the curvature of the strip along its length and therefore a different relative position between the moving contact and the fixed contact so as to close or open the supply circuit to the resistance.

In turn, bi-metal thermostats may be subdivided into thermostats having a fixed setting, in which setting is generally performed in the factory to a fixed value, for example 24° C., which cannot be changed by the user in any way. The electrical supply circuit to the resistance is opened and closed at this value and therefore this type of bi-metal thermostat is unable to optimise adjustment within the desired temperature range.

Another type of bi-metal thermostat is that having simple control, without a graduated scale, similar to the above but in which action has to be taken on the thermostat using an external thermometer in order to regulate its operating temperature, making the regulating operation extremely complex.

Bi-metal thermostats with a graduated scale make it possible to set the temperature by positioning an indicator on a graduated thermometric scale, achieving the temperature desired. In these known thermostats the user can move an indicator along the thermometric scale until it reaches a position corresponding to the desired temperature. At that position the electricity supply circuit to the resistance will be open or closed so as to bring the temperature of the water close to that set on the indicator, within a particular range of oscillation.

Some examples of bi-metal thermostat heaters are described and illustrated in U.S. Pat. No. 4,315,143, U.S. Pat. No. 4,327,281, U.S. Pat. No. 4,975,562 and EP-A-757,507.

A particular disadvantage in known bi-metal regulators lies in the fact that when the circuit is closed the current passes through the strips themselves and as a result of the Joule effect brings about a change in sensitivity depending upon the power of the heating resistance. This gives rise to some slowness in reaching temperature equilibrium conditions and therefore less accuracy in the regulator.

However, users normally need to bring an aquarium rapidly to the desired temperature and then hold it constant without peaks or drift, which are lethal for the survival conditions of the species living in the aquarium.

DISCLOSURE OF THE INVENTION

A general object of this invention is to overcome the abovementioned disadvantages, providing an adjustable heater for aquaria which has the features of high efficiency, sensitivity, accuracy, reliability and affordability.

A particular object is to provide an adjustable heater for aquaria which makes it possible to reach the set temperature quickly and hold it within a relatively narrow range of oscillation.

A further object is to design an adjustable heater for aquaria which makes it possible to maintain the set value as constant as possible.

Yet another is to provide an adjustable heater of the abovementioned type which has a relatively low manufacturing and maintenance cost.

These objects, and others which will become more apparent hereinafter, are achieved by an adjustable heater for aquaria according to claim 1.

In particular the adjustable heater for aquaria comprises a substantially tubular container within which are housed an electrical heating element, a switch comprising fixed contacts and moving contacts capable of electrically connecting the said heating element to an external source of electrical power, a temperature sensor having a bi-metallic strip capable of detecting the temperature of the liquid and interacting with said switch to move it from a closed position to an open position on reaching a predetermined temperature, characterised in that said moving contacts of said switch are secured to one free end of the said strip, the other end of said strip being electrically insulated.

As a result of this arrangement electrical current does not pass through the strip and therefore does not create a Joule effect within it which influences the sensitivity and proper behaviour of the temperature sensor.

It follows that the heater behaves in a particularly precise and reliable way. In addition to this, the linearity and the stability of the liquid thermometer avoid the phenomena of thermal instability and drift known in heaters in the past.

In accordance with another object of the invention, adjustment means acting on an elastic connecting portion of the strip are provided to vary the stiffness of the same and the position of its free end, and therefore the contact means.

In particular, the adjustment means comprise a threaded pin acting on said elastic portion of the strip which can be screwed into a matching threaded seat in the support.

Furthermore, the threaded pin is connected to a knob which projects outside the said container and is provided with a graduated thermometric scale which can be compared with a fixed indicator associated with the container.

The knob is connected to said threaded pin through a small shaft which passes through the said knob and the said container.

In addition to this the adjustment means comprise calibrating means acting on the small shaft to vary the angular position of the said knob with respect to the threaded pin so as to adjust the temperature value indicated on the thermometric scale to that detected by an external reference thermometer.

As a result of this arrangement the heater can be calibrated extremely simply and quickly whenever it becomes inaccurate for various reasons.

BRIEF DESCRIPTION OF THE DRAWINGS

Further features and advantages of the invention will be more clearly understood from the detailed description of a preferred but not exclusive embodiment of an adjustable heater for aquaria illustrated by way of a non-limiting example with the aid of the accompanying drawings in which:

FIG. 1 shows a perspective view of a heater according to the invention with the outer enclosure partly removed for greater clarity, FIG. 2 shows a front view of the heater in FIG. 1.

DETAILED DESCRIPTION OF A PREFERRED EMBODIMENT

Figure 3:
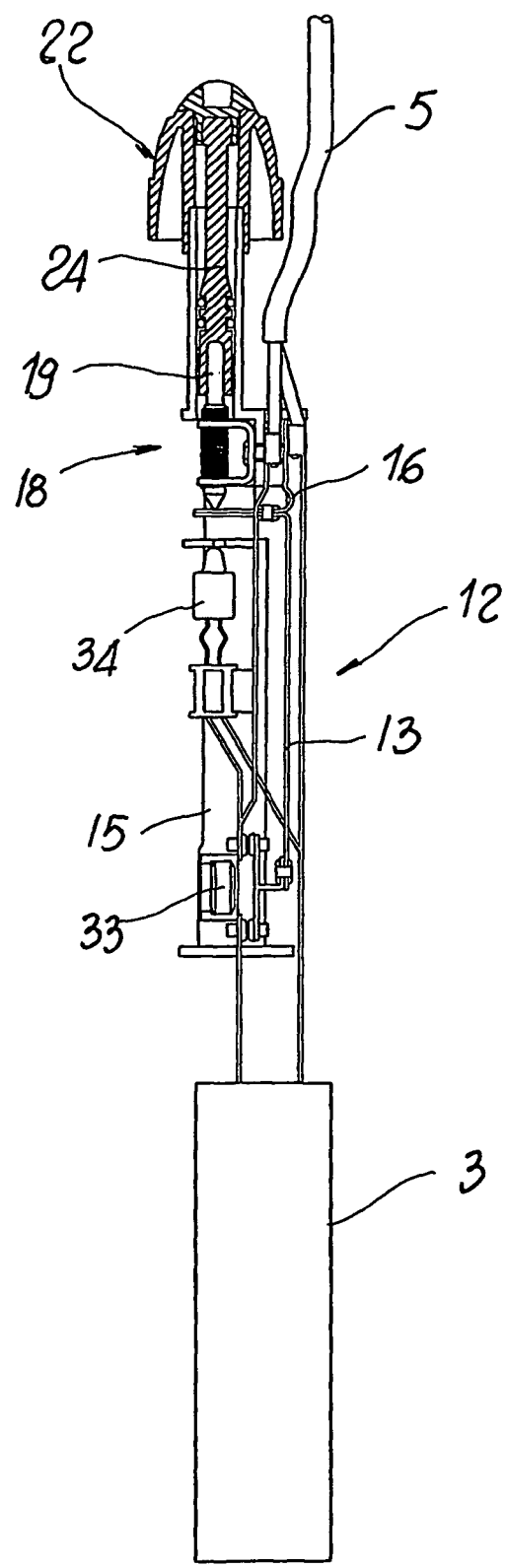
FIG. 3 shows a side view of the heater in the preceding figures without external protection.
Figure 4:
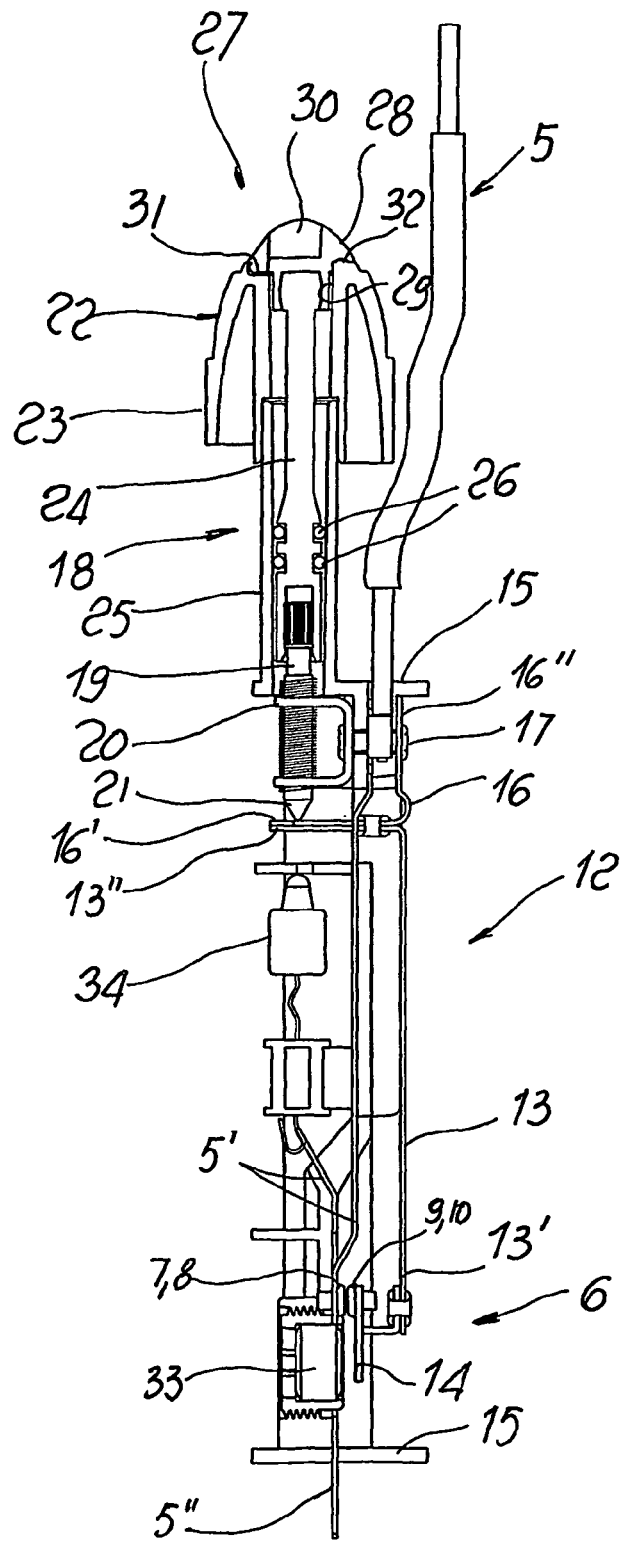
FIG. 4 shows a side view of part of the heater in FIG. 3 on a slightly magnified scale.
Figure 5:
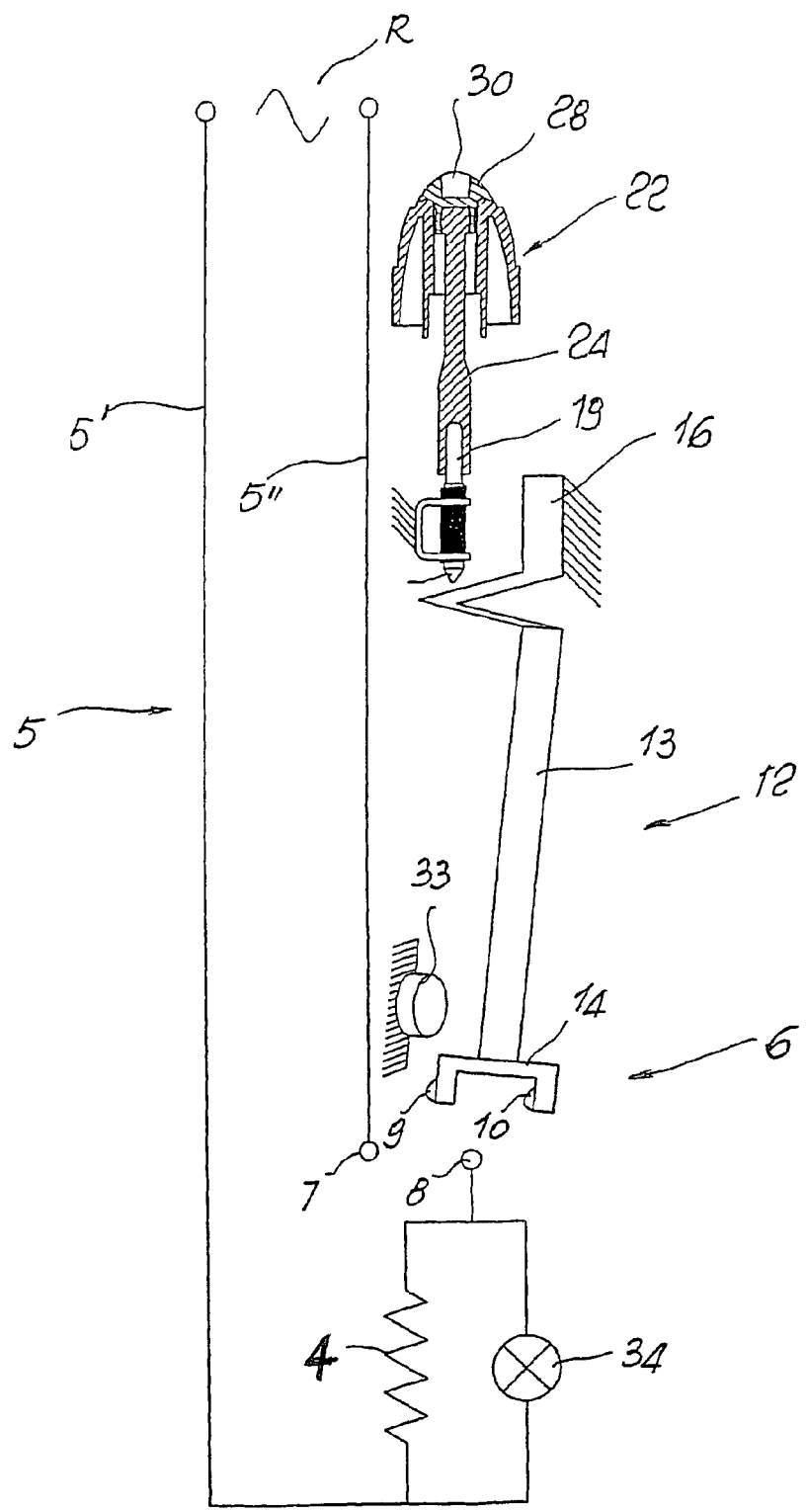
FIG. 5 shows a diagram of the electrical circuit controlling the heater shown in the preceding figures.

With reference to the abovementioned figures, an adjustable heater according to the invention indicated as a whole by reference number 1 comprises a substantially tubular container 2, of preferably transparent material, for example glass, quartz or a similar synthetic material, with one end open, within which a heating element of the electrical type, indicated as a whole by reference number 3, is located.

Heating element 3 may comprise one or more electrical resistances 4, for example of the wire type wound on a cylindrical support of thermally refractory material, not illustrated in the drawings, located in the lower part of container 2.

The various resistances 4 of heating element 3 are powered by an external source of electrical power R through a bipolar cable 5. In particular, one of the terminals of resistance 4 is directly connected to a first conductor 5' of bipolar cable 5, while the other terminal of resistance 4 is connected to second conductor 5" through an electrical switch, indicated as a whole by reference number 6.

In particular switch 6 comprises a first pair of fixed contacts indicated by 7, 8 respectively which can be closed by a pair of moving contacts indicated by 9, 10 respectively.

In order that switch 6 be automatically switched to maintain the liquid in the aquarium at a predetermined temperature T, switch 6 is associated with a temperature sensor, indicated as a whole by 12.

Temperature sensor 12 is of the bi-metal strip type, that is a bi-metal strip 13 having two layers of different metal materials, for example of the type described in U.S. Pat. No. 4,315,143, U.S. Pat. No. 4,327,281, U.S. Pat. No. 4,975,562 and EP-A-757507, which tends to deform through differential expansion as the temperature of the medium in which it is immersed varies.

According to the invention, moving contacts 9, 10 of switch 6 are secured to a free end 13' of strip 13, while the other end 13" of strip 13 is electrically insulated.

In this way no electrical current passes through strip 13, avoiding the Joule effect typical of sensors in the past.

Preferably, moving contacts 9, 10 are mounted on a connecting plate 14, for example of a U-shape, which is in turn anchored to the free end 13' of strip 13.

Desirably, end 8" of the frame is anchored to a supporting frame 15 through an elastic connecting member 16, essentially comprising a small square of piano wire steel or the like, having a portion 16' attached to the transverse end 13" of bi-metal strip 13 and another part 16" fixed through a connecting member 17 to frame 15. In this way bi-metal strip 13 can bend elastically with respect to anchoring point 17, causing the free end 13' of bi-metal strip 13 to oscillate.

Adjustment means, indicated as a whole by reference number 18, which act on elastic connecting member 16 to vary the preloading on the latter and the position of free end 13' of bi-metal strip 13, are provided.

In particular adjustment means 18 comprise a threaded pin 19 screwed into a seat with a matching screw of a support 20 anchored to frame 15, the end 21 of which acts on portion 16' of elastic member 16. The preloading on bi-metal strip 13 is varied by screwing pin 19 by a greater or lesser amount.

Thus it will be possible to adjust the distance between the pair of moving contacts 9, 10 and the pair of fixed contacts 7, 8 so as to vary the switching temperature T of switch 6 and therefore the set temperature for the liquid in the aquarium.

Desirably, a knob 22 which projects outside the container in such a way that it can be rotated by a user is mounted on threaded pin 19 and is provided with a graduated thermometric scale 23 printed on its outer peripheral part which can be aligned with a fixed indicator associated with container 2 which cannot be seen in the drawings.

Knob 22 is connected to threaded pin 19 through a small shaft 24 housed in a cylindrical sleeve 25 with two intermediate sealing O-rings 26.

In a second aspect of the invention adjustment means 18 are provided with calibration means, indicated as a whole by reference number 27, acting on small shaft 24 to vary the angular position of knob 19 with respect to threaded pin 19 so that the temperature indicated on the said thermometric scale can be adjusted to that actually determined in the liquid in the aquarium by means of an external reference thermometer.

In particular, adjustment means 27 comprise an adjustment ratchet 28 positioned in a seat 29 formed by the upper part of knob 22 and rigidly connected to small shaft 24 by welding or any other means.

Ratchet 28 has at the top a notch 30 for the introduction of the blade or tip of a screwdriver and is selectively connected to knob 22 in predetermined angular positions through a variable keying attachment member.

The variable keying connection member may comprise a toothed crown 31 formed in the lower part of ratchet 28 which engages a tooth 32 formed on the upper edge of seat 29. Each tooth in toothed crown 31 corresponds to one rotation of threaded pin 19 which varies the set temperature of the bi-metal strip by approximately 1° C.

Thus in order to calibrate the adjustment means it is possible to determine the effective temperature Te of the liquid in which heater 1 is immersed and cause ratchet 28 to rotate until the indicator fixed on container 2 is in line with the mark on graduated scale 23 corresponding to temperature Te.

In order to keep the contacts in a mutually connected condition and provide operation through an escapement mechanism, a permanent magnet 33 is fixed to frame 15 in a position facing the free end 13' of bi-metal strip 13 to attract metal plate 14 with moving contacts 9, 10.

Finally, in order to indicate to the exterior that current is passing through resistance 4, visual indicator means comprising a lamp or luminous diode 34 connected in parallel to resistance 4 are provided.

In use, the user will adjust the angular position of knob 19 so that the indicator fixed on container 2 coincides with a mark on graduated scale 23 corresponding to the desired temperature T.

In this way screw 19 will act on elastic member 16 and therefore on bi-metal strip 13 so as to vary the position of moving contacts 9, 10 with respect to fixed contacts 7, 8.

When contacts 7, 8 and 9, 10 are in contact, current will pass through resistance 4 but not through bi-metal strip 13. When the temperature of the liquid in the aquarium exceeds a particular set value of the preloading on elastic member 16 the bi-metal strip will deform, separating plate 14 from magnet 33 and therefore moving contacts 9, 10 from fixed contacts 7, 8. At this point the flow of current to the resistance is interrupted and the temperature of the liquid in the aquarium will then fall until the bi-metal strip relaxes again bringing moving contacts 9, 10 into contact with the fixed contacts and starting a new control cycle.

Even though the immersion heater according to the invention has been described with particular reference to the appended drawings, it is capable of many modifications and variants falling within the scope of the inventive concept expressed in the appended claims, all of which are intended to have the same protection.

In addition to this, all details may be replaced by technically equivalent members and materials may differ according to requirements.

What is claimed is:

1. An adjustable heater for acquaria, comprising a substantially tubular container within which are housed an electrical heating element, a switch comprising fixed contacts and moving contacts capable of electrically connecting the said heating element to an outside source of electrical power, a temperature sensor having a bi-metal strip capable of detecting the temperature of the liquid and interacting with the said switch to move it from a closed position to an open position when a predetermined temperature is reached, wherein the moving contacts of the switch are secured to a free end of the bi-metal strip, the other end of the bi-metal strip being electrically insulated so as to prevent current from passing through it, said heating element comprising at least one electrical resistance having a first terminal directly connected to a first conductor of a supply cable from the source of electrical power and a second terminal which can be connected to a second conductor of the said supply cable through said switch, wherein the other end of the said strip is anchored to a supporting frame through an elastic connecting member, adjustment means being provided which act on the elastic connecting member to vary the preloading on the latter and position the free end of bi-metal strip, and escapement means for maintaining the fixed and moving contacts in a mutually connected condition.

2. The heater according to claim 1, wherein the moving contacts are mounted on a connecting plate which is in turn anchored to the free end of the bi-metal strip.

3. The heater according to claim 1, wherein the fixed contacts of the switch are connected respectively to the second supply cable and the second terminal of the at least one resistance, the pair of fixed contacts being in a position facing the pair of moving contacts (9, 10).

4. The heater according to claim 1, wherein the elastic connecting member has a portion substantially transverse to the plane of the extension of the bi-metal strip for connection to the bi-metal strip and a portion substantially parallel to the plane of extension of the bi-metal strip for anchoring to the frame.

5. The heater according to claim 4, comprising adjustment means acting on said substantially transverse portion of the elastic connecting member to vary the stiffness of the bi-metal strip and the position of its free end, and therefore of the pair of moving contacts with respect to the pair of fixed contacts.

6. The heater according to claim 5, wherein the adjustment means comprises a threaded pin acting on the transverse portion of the elastic connecting member and which can be screwed into a seat having a matching thread in a fixed support.

7. The heater according to claim 6, wherein the threaded pin is connected to a knob projecting from the container and provided with a graduated thermometric scale which can be compared with a fixed indicator associated with the container.

8. The heater according to claim 7, wherein the knob is connected to the threaded pin through a small shaft which passes through the container.

9. The heater according to claim 8, comprising means for calibrating the temperature means acting on the small shaft to vary the angular position of the knob with respect to the threaded pin so as to adjust the temperature set on the thermometric scale to that effectively measured by an external reference thermometer.

10. The heater according to claim 9, wherein the said calibration means comprises an adjustment ratchet (28) housed in a seat in the knob rigidly connected to the small shaft and selectively connected to the knob in predetermined angular positions by means of a variable keying connecting member.

11. The heater according to claim 10, wherein the variable keying connecting member comprises a toothed crown which can be engaged by a tooth formed along the upper edge of the seat.

12. The heater according to claim 1, wherein the escapement means includes a magnet proximate to the free and of the bi-metal strip to keep the moving and fixed contact means stably in a connecting position.

13. The heater according to claim 1, including means for visually indicating the position of the switch, comprising a lamp or luminous diode connected in parallel to the electrical heating element.

14. An adjustable heater for acquaria, comprising
a tubular container;
an electrical heating element located in the tubular container;
a switch comprising a pair of spaced apart fixed contacts, one contact being coupled to the heating element and the other being connectable to a power source;
electrically connected moving contacts each for engaging a corresponding one of the fixed contacts to thereby electrically connect the said heating element to the power source the proximate end of the bi-metal strip being electrically insulated to prevent current from the moveable contacts to flow through passing through it a temperature sensor having a bi-metal strip having a proximate end and free end carrying the movable contacts and being capable of detecting the temperature of the liquid and interacting with the said switch to move the moveable contacts from a normally closed position in engagement with the fixed contacts to an open position out of contact therewith when a predetermined temperature is reached;

an adjustment device for preloading the proximate end of the bi-metal strip;

an escapement for securing the fixed and moveable contacts together in the normally closed position.

* * * * *